US012728534B2

(12) United States Patent
Zhang

(10) Patent No.: US 12,728,534 B2
(45) Date of Patent: Sep. 8, 2026

(54) METHOD AND SYSTEM FOR CONTROLLING ROBOT TO TAKE ELEVATOR

(71) Applicant: SHENZHEN PUDU TECHNOLOGY CO., LTD., Shenzhen (CN)

(72) Inventor: Yongsheng Zhang, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 91 days.

(21) Appl. No.: 18/832,439

(22) PCT Filed: Mar. 30, 2023

(86) PCT No.: PCT/CN2023/084987
§ 371 (c)(1),
(2) Date: Jul. 23, 2024

(87) PCT Pub. No.: WO2023/216755
PCT Pub. Date: Nov. 16, 2023

(65) Prior Publication Data
US 2025/0144799 A1 May 8, 2025

(30) Foreign Application Priority Data
May 11, 2022 (CN) ......................... 202210509558.7

(51) Int. Cl.
*B25J 9/16* (2006.01)
*G05D 1/622* (2024.01)
(Continued)

(52) U.S. Cl.
CPC ........... *B25J 9/1666* (2013.01); *B25J 9/1676* (2013.01); *B25J 9/1679* (2013.01); *G05D 1/622* (2024.01);
(Continued)

(58) Field of Classification Search
CPC ... B25J 9/1666; B25J 11/00; B25J 9/16; B25J 9/1628; B25J 9/1676; B25J 9/1679;
(Continued)

(56) References Cited

U.S. PATENT DOCUMENTS

2020/0055694 A1* 2/2020 Sokolov .................... B66B 9/00
2021/0284491 A1* 9/2021 Zhang ................... B66B 1/3461
(Continued)

FOREIGN PATENT DOCUMENTS

CN 110788864 A 2/2020
CN 110861094 A 3/2020
(Continued)

OTHER PUBLICATIONS

Office Action received in corresponding Application No. CN 202210509558.7, dated Dec. 1, 2023, 9 pages.
(Continued)

*Primary Examiner* — Abby Lin
*Assistant Examiner* — Karston G. Evans
(74) *Attorney, Agent, or Firm* — OPENPTO US LLC; Yuhao Liang

(57) ABSTRACT

In one aspect, a robot control method includes: during the process of a robot advancing from a target elevator-waiting place to a target elevator-taking place in an elevator car, acquiring the distance between the robot and an obstacle; and if the distance is greater than a preset distance threshold value, controlling the robot to advance to the target elevator-taking place at a preset speed until the robot enters the elevator car.

14 Claims, 7 Drawing Sheets

(51) Int. Cl.

| | |
|---|---|
| ***G05D 1/633*** | (2024.01) |
| *G05D 1/435* | (2024.01) |
| *G05D 107/60* | (2024.01) |
| *G05D 109/10* | (2024.01) |

(52) U.S. Cl.
CPC ............. *G05D 1/633* (2024.01); *G05D 1/435* (2024.01); *G05D 2107/60* (2024.01); *G05D 2109/10* (2024.01)

(58) Field of Classification Search
CPC ........ B25J 9/161; B25J 9/1664; B25J 13/088; G05D 2107/60; G05D 2109/10; G05D 1/633; G05D 1/435; G05D 1/43
See application file for complete search history.

(56) References Cited

U.S. PATENT DOCUMENTS

| | | | | |
|---|---|---|---|---|
| 2021/0302971 | A1* | 9/2021 | Cousins | G05D 1/0094 |
| 2022/0079406 | A1* | 3/2022 | Zhang | A47L 11/4036 |

FOREIGN PATENT DOCUMENTS

| | | | | | |
|---|---|---|---|---|---|
| CN | 110861095 | A | * | 3/2020 | B25J 9/1666 |
| CN | 112130574 | A | * | 12/2020 | G05D 1/0088 |
| CN | 112405548 | A | | 2/2021 | |
| CN | 112537704 | A | * | 3/2021 | B66B 1/06 |
| CN | 114314227 | A | | 4/2022 | |
| CN | 114489063 | A | | 5/2022 | |
| CN | 114714361 | A | | 7/2022 | |
| JP | 2017033450 | A | | 2/2017 | |
| JP | 2017220122 | A | | 12/2017 | |
| JP | 2018144943 | A | | 9/2018 | |
| JP | 2019109769 | A | | 7/2019 | |
| WO | WO 2018/189770 | A1 | | 10/2018 | |

OTHER PUBLICATIONS

International Search Report and Written Opinion (with English translation) received in corresponding Application No. PCT/CN2023/084987, dated Jul. 24, 2023, 17 pages.

Notice of Reasons for Refusal (with English translation) received in corresponding Application No. JP 2024543849, dated Jun. 16, 2025, 8 pages.

* cited by examiner

METHOD AND SYSTEM FOR CONTROLLING ROBOT TO TAKE ELEVATOR

CROSS-REFERENCE TO RELATED APPLICATIONS

The present application is the national phase under 35 U.S.C. § 371 of PCT international application No. PCT/CN2023/084987, which has an international filing date of Mar. 30, 2023and claims priority to Chinese patent application No. 202210509558.7, titled "ROBOT CONTROL METHOD AND APPARATUS, AND ROBOT, STORAGE MEDIUM AND PROGRAM PRODUCT", filed with the China National Intellectual Property Administration on May 11, 2022. The contents of the above identified PCT international application and Chinese patent application are incorporated herein in their entireties by reference for all purposes.

TECHNICAL FIELD

The present disclosure relates to the field of robotics technologies, and in particular, to a robot control method, a robot, and a storage medium.

BACKGROUND

With the development of robotics technologies, robots can take elevators with people, and can reach various floors of a building to perform tasks.

In conventional art, if a robot wants to take an elevator, the robot selects an elevator with small passenger flow and low busyness in the building as a target elevator, sends a call request to the target elevator, and then takes the elevator.

However, in scenes with heavy traffic, there is a problem that the robot cannot take the elevator.

SUMMARY

According to various embodiments of the present disclosure, a robot control method and apparatus, a robot, a storage medium, and a program product are provided.

In a first aspect, the present disclosure provides a robot control method. The method includes:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In a second aspect, the present disclosure further provides a robot control apparatus. The apparatus includes:

a first acquisition module configured to obtain a distance between a robot and an obstacle as the robot moves from a target elevator-waiting place to a target elevator-taking place in an elevator car; and a first control module configured to control, if the distance is greater than a preset distance threshold, the robot to move towards the target elevator-taking place at a preset speed until the robot enters the elevator car.

In a third aspect, the present disclosure further provides a robot, including a processor and a memory storing a computer program. The processor, when executing the computer program, implements the following steps:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In a fourth aspect, the present disclosure further provides a computer-readable storage medium having a computer program stored therein. When the computer program is executed by a processor, the following steps are implemented:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In a fifth aspect, the present disclosure further provides a computer program product including a computer program. When the computer program is executed by a processor, the following steps are implemented:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

One or more embodiments of the present disclosure will be described in detail below with reference to drawings. Other features, objects and advantages of the present disclosure will become more apparent from the description, drawings, and claims.

BRIEF DESCRIPTION OF THE DRAWINGS

In order to describe the technical solutions of the embodiments of the present disclosure or the conventional art more clearly, the accompanying drawings required for describing the embodiments or for describing the conventional art will be briefly introduced as follows. Apparently, the accompanying drawings, in the following description, illustrate merely some embodiments of the present disclosure, for a person of ordinary skill in the art, drawings of other embodiments can also be obtained according to these accompanying drawings without making any creative efforts.

DETAILED DESCRIPTION OF THE EMBODIMENTS

In order to facilitate understanding of the present disclosure, the present disclosure will be described more fully below with reference to the relevant accompanying drawings. Preferred embodiments of the present disclosure are presented in the accompanying drawings. However, the present disclosure may be implemented in many different forms and is not limited to the embodiments described herein. Rather, these embodiments are provided for the purpose of making the understanding of the present disclosure more thorough and comprehensive.

Unless otherwise defined, all technical and scientific terms used herein have the same meaning as commonly understood by a person of ordinary skill in the art to which the present disclosure belongs. The terms used herein in the specification of the application are for the purpose of describing specific embodiments only, and are not intended to limit the application. The term "and/or" as used herein includes any and all combinations of one or more of the relevant listed items.

In present embodiment, a robot control method is provided. This embodiment takes the method applied to a robot as an example for illustration. It should be understood that the method can also be applied to a server, or a system including a robot and a server, and can be achieved through an interaction between the robot and the server.

Figure 1:
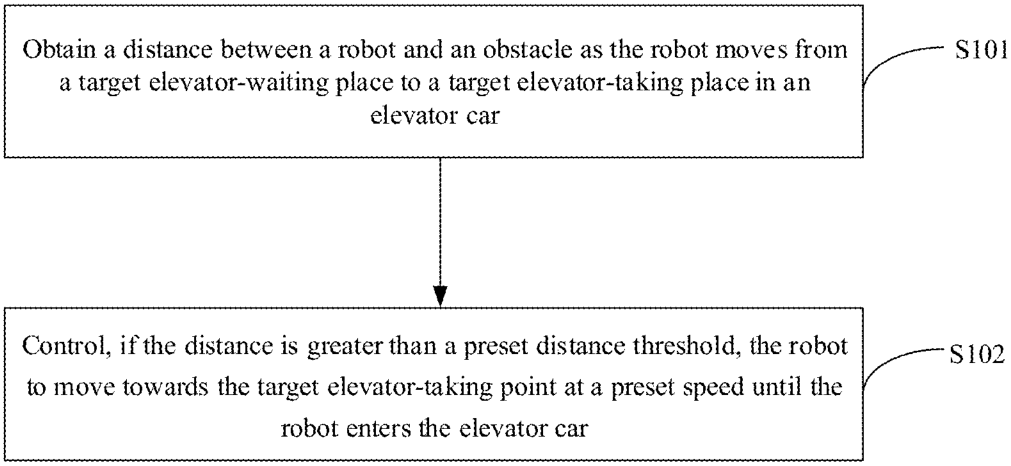
FIG. 1 is a flow diagram illustrating a robot control method according to an embodiment of the present disclosure.

FIG. 1 is a flow diagram illustrating a robot control method according to an embodiment of the present disclosure. The method is applied to a robot or a server. In an embodiment, as shown in FIG. 1, the method includes the following steps.

In step S101, a distance between a robot and an obstacle is obtained as the robot moves from a target elevator-waiting place to a target elevator-taking place in an elevator car.

Figure 2:
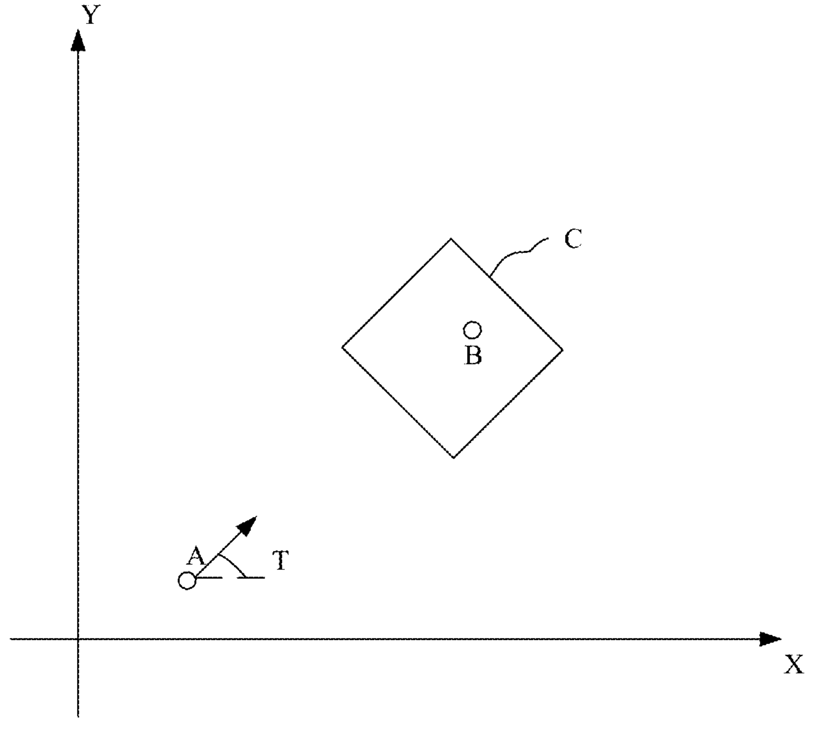
FIG. 2 is a schematic diagram illustrating a scene of a robot taking an elevator according to an embodiment of the present disclosure.

In this embodiment, the target elevator-waiting place, the target elevator-taking place and an area where the elevator car is located are each set in advance by a person skilled in the art. An example of a scene of the robot taking the elevator by moving from the target elevator-waiting place to the target elevator-taking place in the elevator car is shown in FIG. 2. FIG. 2 is a schematic diagram illustrating a scene of a robot taking an elevator according to an embodiment of the present disclosure. A plane coordinate system is established with a horizontal direction as the X-axis in FIG. 2, where A is the set target elevator-waiting place, B is the set target elevator-taking place, and C is the set area where the elevator car is located.

In this embodiment, the distance between the robot and the obstacle is obtained by mounting a sensor on the robot. The sensor includes but is not limited to a depth camera, a laser radar, or a device capable of measuring a distance between the two.

The obstacle may be a person, or an object such as a cart or a pillar, which is not limited thereto.

In step S102, if the distance is greater than a preset distance threshold, the robot is controlled to move towards the target elevator-taking place at a preset speed until the robot enters the elevator car.

In this embodiment, the preset distance threshold is, for example, 2 cm, and the preset speed is, for example, 0.1 m/s. The advantage of setting the preset distance threshold to 2 cm is that the distance between the robot and the obstacle can be further shortened in a scene with a large passenger flow, ensuring that the robot can crowd into the elevator.

In the above robot control method, the distance between the robot and the obstacle is obtained as the robot moves from the target elevator-waiting place to the target elevator-taking place in the elevator car, and if the distance is greater than the preset distance threshold, the robot is controlled to move towards the target elevator-taking place at the preset speed until the robot enters the elevator car. In conventional art, the robot first determines the busyness of the elevator, and then calls an elevator with a small passenger flow and low busyness for taking. In this embodiment, regardless of whether the passenger flow is large or small, the robot only needs to reach the target elevator-taking place, and call an elevator for taking, solving the problem that the robot cannot take the elevator in the scene with a large passenger flow.

In some embodiments, the method further includes: controlling, if the distance is less than the preset distance threshold, the robot to stop moving.

In this embodiment, when the distance between the robot and the obstacle is less than 2 cm, the robot is controlled to stop moving, and the robot approaches the obstacle through inertia. Because the preset speed of the robot when moving is relatively small and a certain space distance is reserved, even if the robot approaches the obstacle through the inertia and collides with the obstacle, it will not cause a danger to the robot or the obstacle, and it can provide security for the robot to keep exploring ahead. In this case, as long as the distance is greater than the preset distance threshold, the robot crowds into the elevator car.

Figure 3:
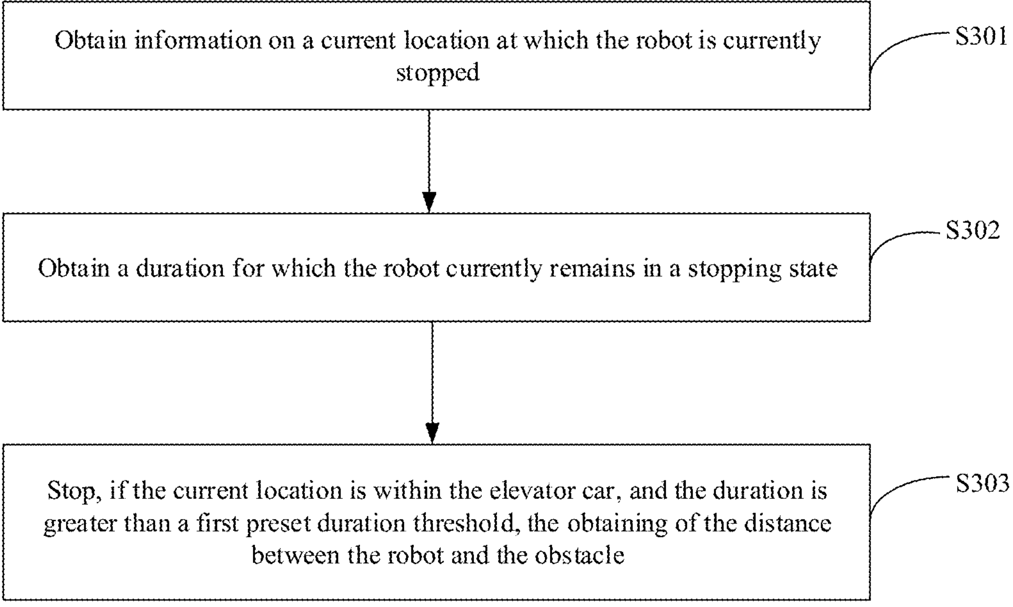
FIG. 3 is a flow diagram illustrating a method for obtaining a stopping location and a stopping duration for a robot according to an embodiment of the present disclosure.

FIG. 3 is a flow diagram illustrating a method for obtaining a stopping location and a stopping duration for a robot according to an embodiment of the present disclosure. Referring to FIG. 3, this embodiment relates to a possible implementation method of how to determine the next operation of the robot based on information on a current location where the robot stops moving and a duration for which the robot stopping moving. Based on the above embodiment, the method further includes the following steps.

In step S301, information on a current location of the robot when the robot currently stops moving is obtained.

In this embodiment, the information on the current location of the robot when it stops moving is represented by a coordinate, which is (X, Y, theta), and the coordinate is in the plane coordinate system in FIG. 2, where theta represents a current orientation angle of the robot, i.e., an angle between the front orientation of the robot and the X-axis, such as the angle T shown in FIG. 2.

In step S302, a duration for which the robot currently remains in a stopping state is obtained.

In step S303, if the current location is within the elevator car, and the duration is greater than a first preset duration threshold, the obtaining of the distance between the robot and the obstacle is stopped.

In this embodiment, the first preset time threshold is, for example, 5 seconds. In this case, the robot is already located in the elevator car, and a duration of stay exceeds 5 seconds, which indicates that the robot cannot move forward for a certain period of time. Therefore, the obtaining of the distance between the robot and the obstacle is stopped, thereby saving the internal energy of the robot and avoiding waste of resources.

In some embodiments, the method further includes:

obtaining, if the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

In this embodiment, in a case that the robot is already located in the elevator car, if it is detected that the distance between the robot and the obstacle is greater than the preset distance threshold, the robot is still controlled to move towards the target elevator-taking place, which ensures that the waste of elevator resources can be further reduced in a scene for taking the elevator with a large passenger flow, thereby allowing more people to take the elevator, ensuring a good experience for people taking the elevator, and making people willing to take the elevator with the robot. In addition, in conventional art, a large space around the robot is generally required to leave for the robot to take the elevator, while in the present disclosure, it is achieved that the robot can crowd into the elevator like a person.

In some embodiments, the method further includes:

controlling, if the current location is not within the elevator car, and the duration is greater than a second preset duration threshold, the robot to move towards the target elevator-waiting place, and call the elevator car again.

In this embodiment, the second preset duration threshold is, for example, 30 seconds. In this case, the robot is not located in the elevator car, and the duration of stay is up to 30 seconds. It is possible that the robot fails to take the elevator. In this case, it is necessary to control the robot to move towards the target elevator-waiting place and call the elevator car again, ensuring that the robot can eventually take the elevator. The reason why the robot is allowed to move towards the target elevator-waiting place instead of waiting in place is that the actual on-site situation is relatively complicated, and the robot may be too close to the elevator in this case, which may easily cause a danger.

In some embodiments, the method further includes:

obtaining, if the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed.

In this embodiment, in this case, since the robot has not entered the elevator car, and the duration of stay is short, the robot is still controlled to move forward. If the robot can take the elevator at this time, it can save the waiting time for calling the elevator again, thereby improving the efficiency of the robot taking the elevator.

In an embodiment of the present disclosure, a movement process of the robot encountering an obstacle is described below.

Figure 4:
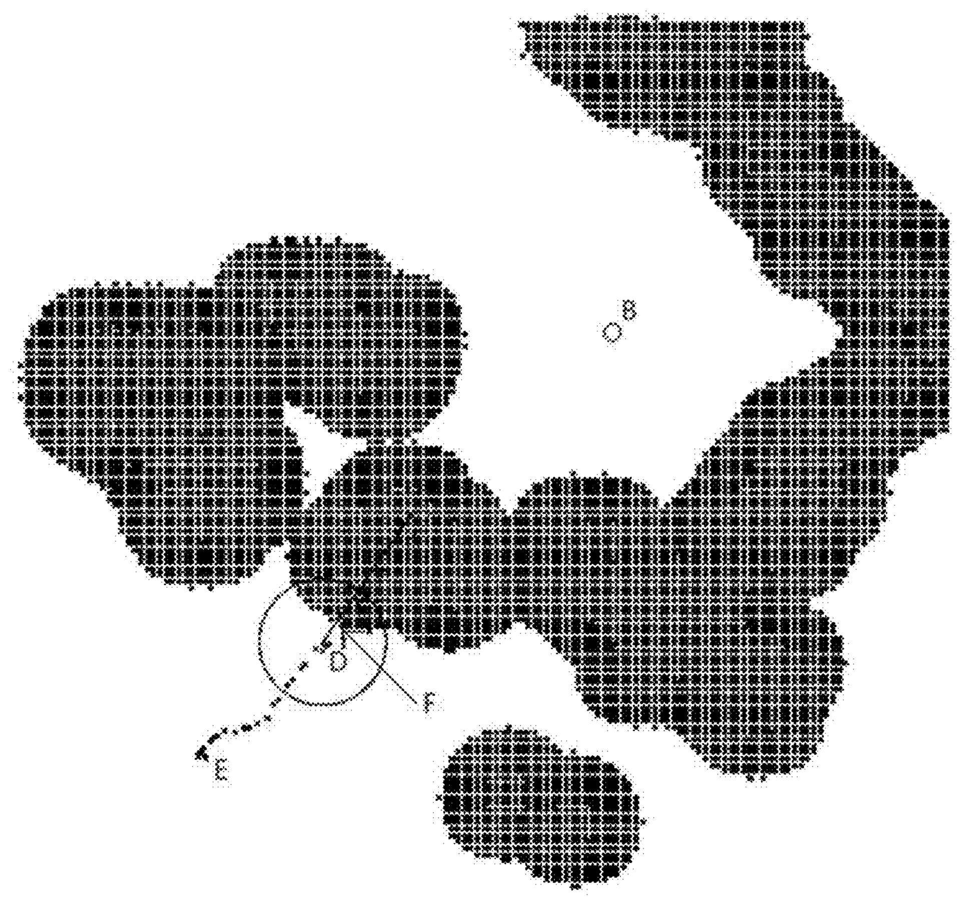
FIG. 4 is a schematic diagram illustrating an obstacle in front of a robot according to an embodiment of the present disclosure.

Firstly, the robot encounters an obstacle, as shown in FIG. 4. FIG. 4 is a schematic diagram illustrating an obstacle in front of a robot according to an embodiment of the present disclosure. In FIG. 4, B is the target elevator-taking place, D, as a center of a circle, represents the current location of the robot, DE segment is a line segment connected by several points, representing a historical movement trajectory of the robot, DF segment represents a current orientation of the robot, and the shaded area represents locations of the obstacles. It can be seen from FIG. 4 that the distance between the robot and the obstacle is less than the preset distance threshold, so the robot is controlled to stop moving.

Figure 5:
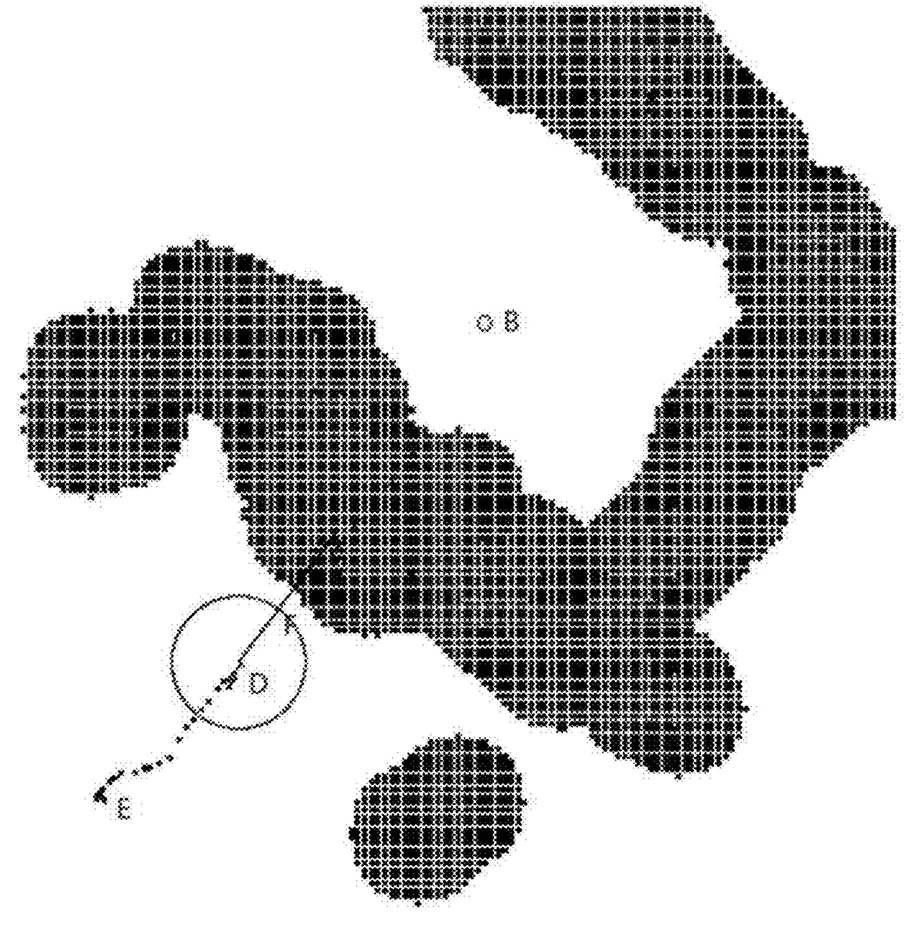
FIG. 5 is a schematic diagram illustrating an obstacle being far away from a robot for a certain distance according to an embodiment of the present disclosure.

Then the robot keeps obtaining the distance between the robot and the obstacle until it is detected that the distance between the obstacle and the robot is greater than the preset distance threshold. In this case, the obstacle is far away from the robot, as shown in FIG. 5. FIG. 5 is a schematic diagram illustrating an obstacle being far away from a robot for a certain distance according to an embodiment of the present disclosure. In FIG. 5, B is the target elevator-taking place, D, as a center of a circle, represents the current location of the robot, DE segment is a line segment connected by several points, representing a historical movement trajectory of the robot, DF segment represents a current orientation of the robot, and the shaded area represents locations of the obstacles. It is easy to see from FIG. 5 that the obstacle is far away from the robot for a certain distance in this case.

Figure 6:
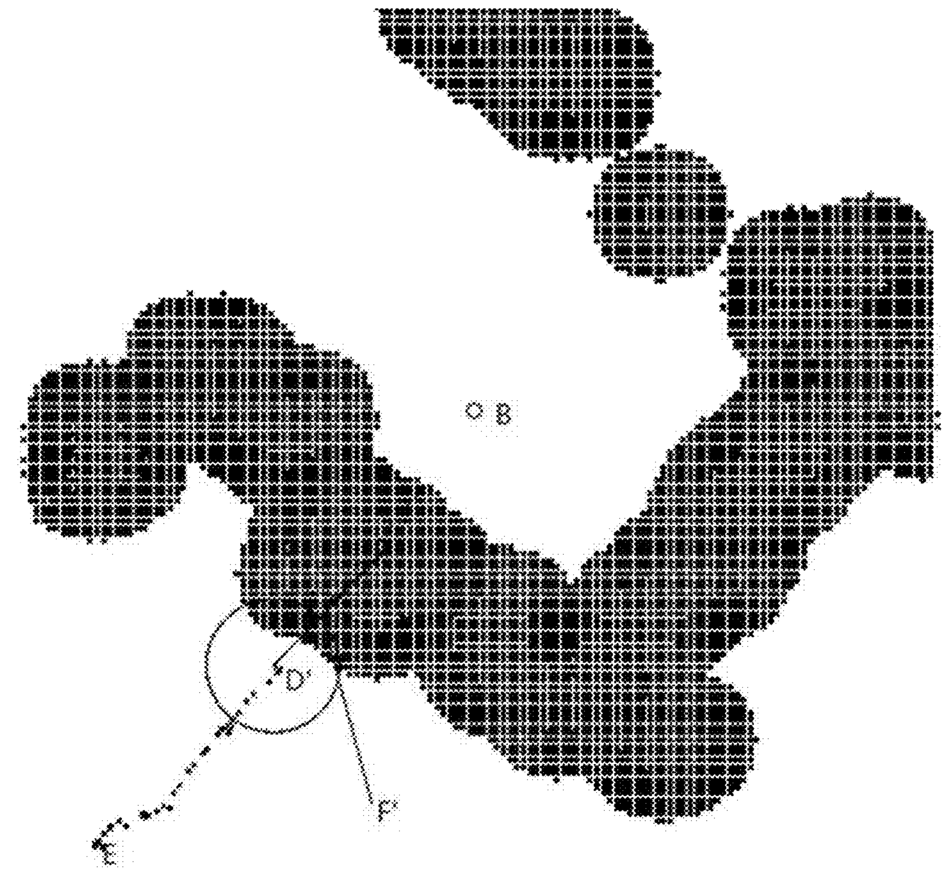
FIG. 6 is a schematic diagram illustrating a robot moving forward and approaching an obstacle according to an embodiment of the present disclosure.

Finally, when the robot detects that the distance from the obstacle is greater than the preset distance threshold, the robot moves towards the target elevator-taking place B at the preset speed until the distance between the robot and the obstacle is less than the preset distance threshold. In this case, the robot moves forward to the current location, as shown in FIG. 6. FIG. 6 is a schematic diagram illustrating a robot moving forward and approaching an obstacle according to an embodiment of the present disclosure. In FIG. 6, B is the target elevator-taking place, D', as a center of a circle, represents the current location of the robot, D'E segment is a line segment connected by several points, representing a historical movement trajectory of the robot, D'F' segment represents a current orientation of the robot, and the shaded area represents locations of the obstacles. It can be seen from FIG. 6 that the robot stops moving when it approaches the obstacle.

Figure 7:
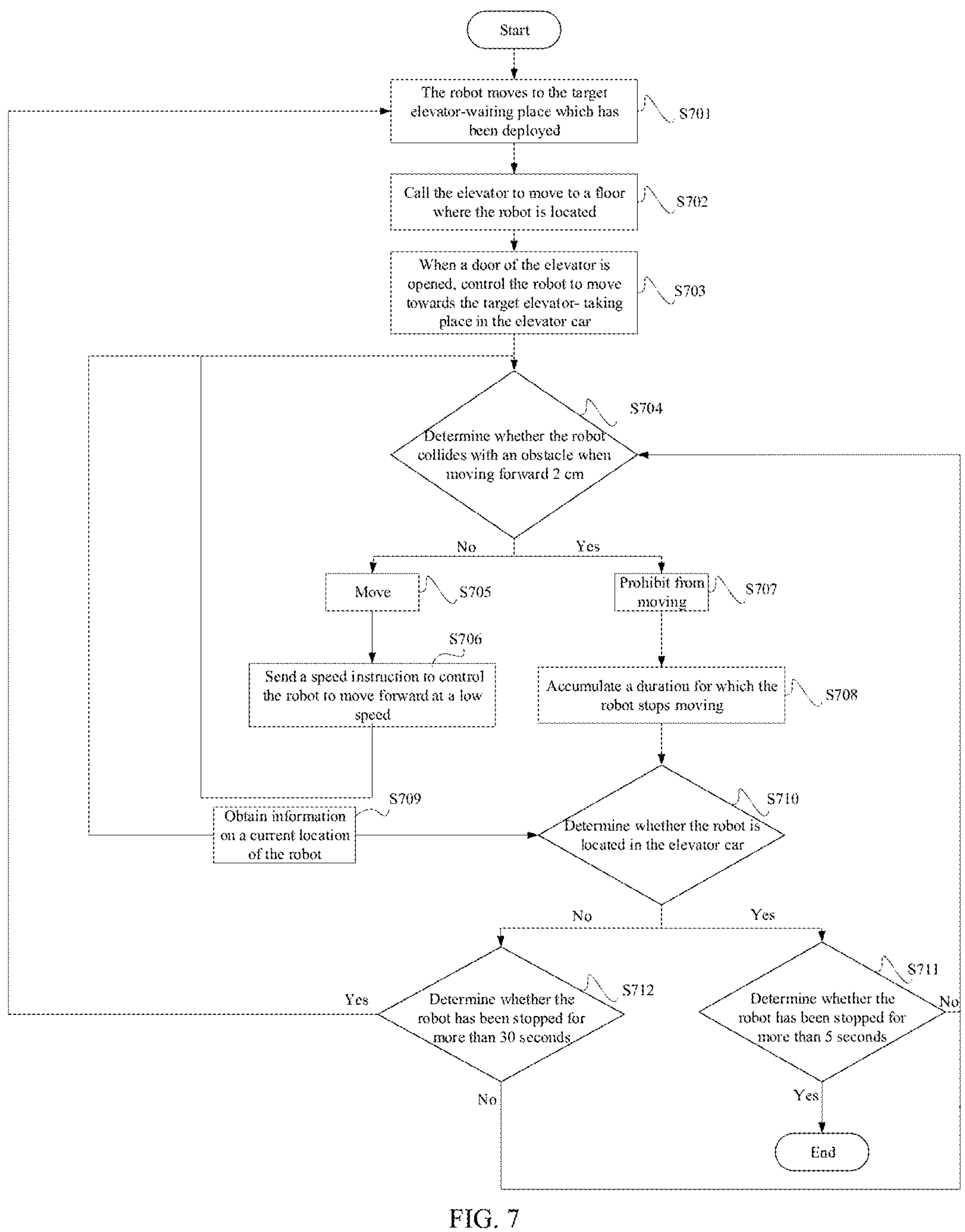
FIG. 7 is a flow diagram illustrating a method for a robot to take an elevator according to an embodiment of the present disclosure.

FIG. 7 is a flow diagram illustrating a method for a robot to take an elevator according to an embodiment of the present disclosure. Referring to FIG. 7, the present embodiment relates to an implementation method of how to control the robot to take the elevator. When the robot takes the elevator for the first time, the technician places it at a target floor, which may be the first floor, and records that the robot is located at the first floor. Then the robot can take the elevator to any floor and record the floor where the robot is located. Based on the above embodiment, the process of the robot taking the elevator includes the following steps.

In step S701, the robot moves to the target elevator-waiting place which has been deployed.

For example, when the robot receives an elevator-taking instruction, the robot starts to perform the robot control method to control the robot to move to the deployed target elevator-waiting place.

In step S702, the elevator is called to move to a floor where the robot is located.

For example, the robot calls the elevator to the floor where the robot is located through a communication protocol.

In step S703, a door of the elevator is opened, and the robot is controlled to move towards the target elevator-taking place in the elevator car.

For example, the robot senses the opening of the door of the elevator through a communication protocol. After the door of the elevator is opened, the robot is controlled to move towards the target elevator-taking place in the elevator car which has been deployed.

In step S704, it is determined whether the robot collides with an obstacle when moving forward 2 cm.

For example, the distance between the robot and the obstacle is obtained through a sensor on the robot, and then it is determined whether the robot collides with the obstacle when moving forward 2 cm based on the distance between the robot and the obstacle.

If the robot does not collide with the obstacle when moving forward 2 cm, step S705 is executed. If the robot collides with the obstacle when moving forward 2 cm, step S707 is executed.

In step S705, the robot can move.

In step S706, a speed instruction is sent to control the robot to move forward at a low speed.

For example, the speed instruction is sent to the robot to control the robot to continue moving at the low speed of 0.1 m/s.

In step S707, the robot is prohibited from moving.

In step S708, a duration for which the robot stops moving is accumulated.

For example, the duration for which the robot currently stops moving is accumulated.

In step S709, information on a current location is obtained.

For example, a coordinate of the current location at which the robot currently stops moving is obtained as for example, the coordinate (X, Y, theta).

In step S710, it is determined whether the robot is located in the elevator car.

For example, based on whether the coordinate of the current location of the robot is located in an area where the deployed elevator car is located, it is determined whether the robot is located in the elevator car.

If the robot is located in the elevator car, step S711 is executed. If the robot is not located in the elevator car, step S712 is executed.

In step S711, it is determined whether the robot has been stopped for more than 5 seconds.

If the robot has been stopped for more than 5 seconds, the robot stops obtaining the distance between the robot and the obstacle, indicating that the robot has successfully entered the elevator, and thus the elevator-entering process of the robot ends. If the robot has been stopped for less than or equal to 5 seconds, step S704 is executed.

In step S712, it is determined whether the robot has been stopped for more than 30 seconds.

If the robot has been stopped for more than 30 seconds, step S701 is executed. If the robot has been stopped for less than or equal to 30 seconds, step S704 is executed.

Figure 8:
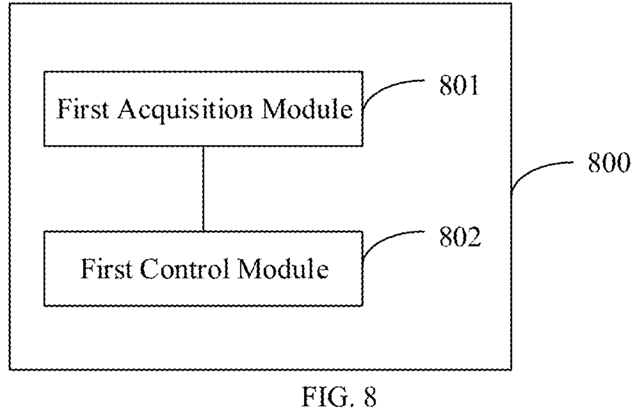
FIG. 8 is a block diagram illustrating a configuration of a robot control apparatus according to an embodiment of the present disclosure.

Referring to FIG. 8, FIG. 8 is a block diagram illustrating a configuration of a robot control apparatus according to an embodiment of the present disclosure. The apparatus 800 includes: a first acquisition module 801 and a first control module 802.

The first acquisition module 801 is configured to obtain a distance between a robot and an obstacle as the robot moves from a target elevator-waiting place to a target elevator-taking place in an elevator car.

The first control module 802 is configured to control, if the distance is greater than a preset distance threshold, the robot to move towards the target elevator-taking place at a preset speed until the robot enters the elevator car.

In the robot control apparatus provided in the present embodiment, the distance between the robot and the obstacle is obtained as the robot moves from the target elevator-waiting place to the target elevator-taking place in the elevator car, and if the distance is greater than the preset distance threshold, the robot is controlled to move towards the target elevator-taking place at the preset speed until the robot enters the elevator car. In conventional art, the robot first determines the busyness of the elevator, and then calls an elevator with a small passenger flow and low busyness for taking. In this embodiment, regardless of whether the passenger flow is large or small, the robot only needs to reach the target elevator-taking place, and call an elevator for taking, solving the problem that the robot cannot take the elevator in the scene with a large passenger flow.

Optionally, the apparatus 800 further includes:

a second control module configured to control, if the distance is less than the preset distance threshold, the robot to stop moving.

Optionally, the apparatus 800 further includes:

a second acquisition module configured to obtain information on a current location of the robot when the robot currently stops moving;

a third acquisition module configured to obtain a duration for which the robot currently remains in a stopping state; and a third control module configured to stop, if the current location is within the elevator car, and the duration is greater than a first preset duration threshold, the obtaining of the distance between the robot and the obstacle.

Optionally, the third control module is further configured to obtain, if the current location is within the elevator car, and the duration is less than or equal to the first preset duration threshold, the distance between the robot and the obstacle, and configured to control, in a case that the obtained distance between the robot and the obstacle is greater than the preset distance threshold, the robot to move towards the target elevator-taking place at the preset speed.

Optionally, the third control module is further configured to control, if the current location is not within the elevator car, and the duration is greater than a second preset duration threshold, the robot to move towards the target elevator-waiting place, and configured to call the elevator car again.

Optionally, the third control module is further configured to obtain, if the current location is not within the elevator car, and the duration is less than or equal to the second preset duration threshold, the distance between the robot and the obstacle, and configured to control, in a case that the obtained distance between the robot and the obstacle is greater than the preset distance threshold, the robot to move towards the target elevator-taking place at the preset speed.

The individual modules in the above robot control apparatus can be implemented in whole or in part by software, hardware and combinations thereof. Each of the above modules may be embedded in hardware form or independent of a processor in the robot, or may be stored in software form on a memory in the robot so that the processor can be called to perform the operations corresponding to each of the above modules.

Figure 9:
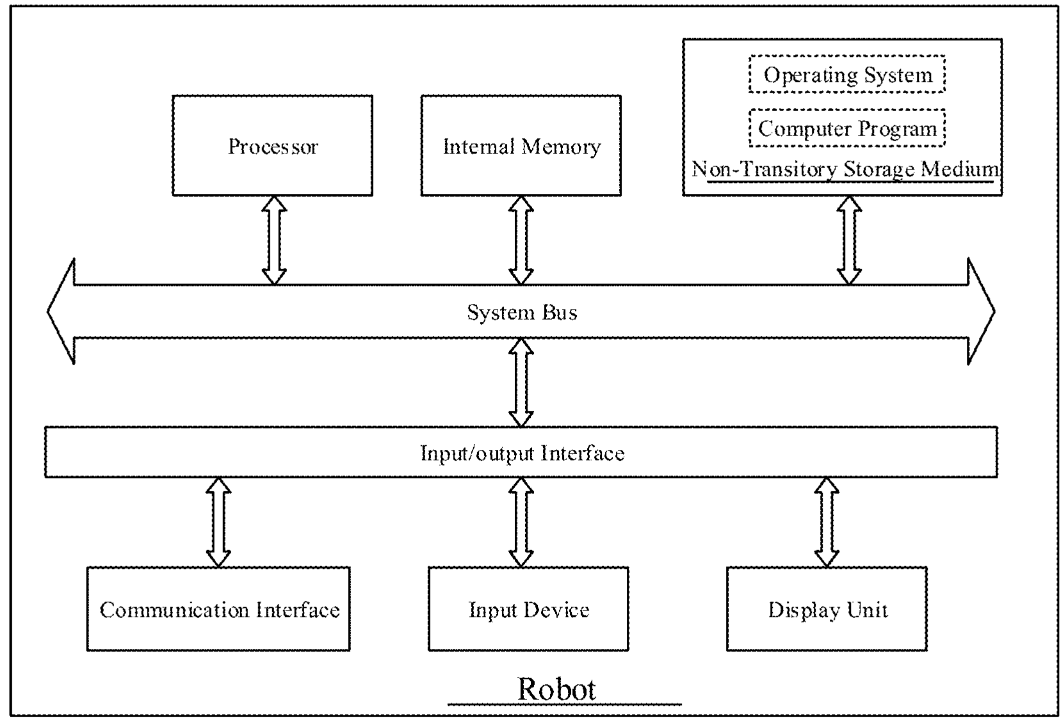
FIG. 9 is a diagram illustrating an internal configuration of a robot according to an embodiment of the present disclosure.

FIG. 9 is a diagram illustrating an internal configuration of a robot according to an embodiment of the present disclosure. In the present embodiment, a robot is provided, and a diagram illustrating an internal configuration of the robot may be shown in FIG. 9. The robot includes a processor, a memory, a communication interface, a display screen, and an input device connected via a system bus. The processor of the robot is configured to provide computing and control capabilities. The memory of the robot includes a non- transitory storage medium and an internal memory. The non-transitory storage medium stores operating systems and computer programs. The internal memory provides an environment for the operation of operating systems and computer programs in non-transitory storage medium. The communication interface of the robot is configured to communicate with external terminals in wired or wireless mode, which can be realized by WIFI, mobile cellular network, near field communication (NFC) or other technologies.

The computer programs are executed by the processor in order to implement a robot control method. The display screen of the robot may be an LCD or e-ink display, and the input device of the robot may be a touch layer covered by the display screen, or a key, trackball or trackpad set on the housing of the robot, or an external keyboard, trackpad or mouse, etc.

It should be understood by a person of ordinary skill in the art that the configuration illustrated in FIG. 9, which is only a block diagram of part of the configuration related to the solution of the present disclosure, and does not constitute a limitation on the robot to which the solution of the present disclosure is applied. Specifically, the robot may include more or less components than those shown in the figure, or may combine some components, or may have a different arrangement of components.

In an embodiment, a robot is provided. The robot includes a processor and a memory storing a computer program. The processor, when executing the computer program, implements steps of the robot control method provided in the above embodiment, including:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In an embodiment, the processor, when executing the computer program, further implements the following step:

controlling, if the distance is less than the preset distance threshold, the robot to stop moving.

In an embodiment, the processor, when executing the computer program, further implements the following steps:

obtaining current location of the robot when the robot currently stops moving;

obtaining a duration for which the robot currently remains in a stopping state; and stopping, if the current location is within the elevator car, and the duration is greater than a first preset duration threshold, the obtaining of the distance between the robot and the obstacle.

In an embodiment, the processor, when executing the computer program, further implements the following steps:

obtaining, if the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

In an embodiment, the processor, when executing the computer program, further implements the following step:

controlling, if the current location is not within the elevator car, and the duration is greater than a second preset duration threshold, the robot to move towards the target elevator-waiting place, and call the elevator car again.

In an embodiment, the processor, when executing the computer program, further implements the following steps:

obtaining, if the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed. The implementation principle and technical effects of the above embodiments are similar to those of the above method embodiments, and will not be repeated here.

In an embodiment, a computer-readable storage medium is provided. The computer-readable storage medium has a computer program stored therein. When the computer program is executed by a processor, steps of the robot control method provided in the above embodiment are implemented, including:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In an embodiment, when the computer program is executed by the processor, the following step is implemented:

controlling, if the distance is less than the preset distance threshold, the robot to stop moving.

In an embodiment, when the computer program is executed by the processor, the following steps are implemented:

obtaining information on a current location of the robot when the robot currently stops moving;

obtaining a duration for which the robot currently remains in a stopping state; and stopping, if the current location is within the elevator car, and the duration is greater than a first preset duration threshold, the obtaining of the distance between the robot and the obstacle.

In an embodiment, when the computer program is executed by the processor, the following steps are implemented:

obtaining, if the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

In an embodiment, when the computer program is executed by the processor, the following step is implemented:

controlling, if the current location is not within the elevator car, and the duration is greater than a second preset duration threshold, the robot to move towards the target elevator-waiting place, and call the elevator car again.

In an embodiment, when the computer program is executed by the processor, the following steps are implemented:

obtaining, if the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed. The implementation principle and technical effects of the above embodiments are similar to those of the above method embodiments, and will not be repeated here.

In an embodiment, a computer program product including a computer program is provided. When the computer program is executed by a processor, the following steps are implemented:

obtaining a distance between a robot and an obstacle as the robot moves from a target elevator-waiting place to a target elevator-taking place in an elevator car; and controlling, if the distance is greater than a preset distance threshold, the robot to move towards the target elevator-taking place at a preset speed until the robot enters the elevator car.

In an embodiment, when the computer program is executed by the processor, the following step is implemented:

controlling, if the distance is less than the preset distance threshold, the robot to stop moving.

In an embodiment, when the computer program is executed by the processor, the following steps are implemented:

obtaining information on a current location of the robot when the robot currently stops moving;

obtaining a duration for which the robot currently remains in a stopping state; and stopping, if the current location is within the elevator car, and the duration is greater than a first preset duration threshold, the obtaining of the distance between the robot and the obstacle.

In an embodiment, when the computer program is executed by the processor, the following steps are implemented:

obtaining, if the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

In an embodiment, when the computer program is executed by the processor, the following step is implemented:

controlling, if the current location is not within the elevator car, and the duration is greater than a second preset duration threshold, the robot to move towards the target elevator-waiting place, and call the elevator car again.

In an embodiment, when the computer program is executed by the processor, the following steps are implemented:

obtaining, if the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed.

The implementation principle and technical effects of the above embodiments are similar to those of the above method embodiments, and will not be repeated here.

It should be noted that the user information (including but not limited to user device information, user personal information, etc.) and data (including but not limited to data used for analysis, stored data, displayed data, etc.) involved in the present disclosure are information and data authorized by the user or fully authorized by all parties.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes of the embodiments of the above methods. Any reference to memory, database or other medium used of the embodiments provided in the present disclosure may include at least one of a non-transitory and a transitory memory. The non-transitory memory may include a read-only memory (ROM), a magnetic tape, a floppy disk, a flash memory, an optical memory, a high-density embedded non-transitory memory, a resistive random-access memory (ReRAM), a magneto resistive random-access memory (MRAM), a ferroelectric random-access memory (FRAM), a phase change memory (PCM), or a graphene memory, etc. The transitory memory may include a random-access memory (RAM) or an external cache memory, etc. As an illustration rather than a limitation, the random-access memory may be in various forms, such as a static random-access memory (SRAM) or a dynamic random-access memory (DRAM), etc. The databases involved of the embodiments provided by the present disclosure may include at least one of a relational database and a non-relational database. The non-relational database may include, but is not limited to, a blockchain-based distributed database, etc. The processor involved of the embodiments provided by the present disclosure may be, but is not limited to, a general-purpose processor, a central processor, a graphics processor, a digital signal processor, a programmable logic device, a data processing logic device based on quantum computation, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present disclosure, and their description is specific and detailed, but should not be understood as a limitation on the patent scope of the present disclosure. It should be noted that, for a person of ordinary skill in the art may further make variations and improvements without departing from the conception of the present disclosure, and these all fall within the protection scope of the present disclosure. Therefore, the protection scope of the present disclosure should be subject to the appended claims.

The invention claimed is:

1. A robot control method, comprising:

obtaining, a distance between a robot and an obstacle in a moving route as the robot moves from a target elevator-waiting place to a target elevator-taking place in an elevator car;

controlling, when the distance is greater than a preset distance threshold, the robot to move towards the target elevator-taking place at a preset speed until the robot enters the elevator car;

controlling, when the distance is less than the preset distance threshold, the robot to stop moving;

obtaining information on a current location of the robot when the robot currently stops moving;

obtaining a duration for which the robot currently remains in a stopping state; and stopping, when the current location is within the elevator car, and the duration is greater than a first preset duration threshold, the obtaining of the distance between the robot and the obstacle.

2. The method according to claim 1, further comprising:

obtaining, when the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

3. The method according to claim 1, further comprising:

controlling, when the current location is not within the elevator car, and the duration is greater than a second preset duration threshold, the robot to move towards the target elevator-waiting place, and call the elevator car again.

4. The method according to claim 3, further comprising:

obtaining, when the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed.

5. The method according to claim 1, further comprising:

controlling, in a case that the robot receives an elevator-taking instruction, the robot to move towards the target elevator-waiting place which has been deployed;

calling, through a first communication protocol, the elevator car to move to a floor where the robot is located, and sensing, through a second communication protocol, whether a door of the elevator car is opened; and controlling, in a case that the door of the elevator car is opened, the robot to move towards the target elevator-taking place in the elevator car which has been deployed.

6. A robot comprising a processor and a memory storing a computer program, wherein the processor, when executing the computer program, implements:

obtaining, a distance between a robot and an obstacle in a moving route as the robot moves from a target elevator-waiting place to a target elevator-taking place in an elevator car;

controlling, when the distance is greater than a preset distance threshold, the robot to move towards the target elevator-taking place at a preset speed until the robot enters the elevator car;

controlling, when the distance is less than the preset distance threshold, the robot to stop moving;

obtaining information on a current location of the robot when the robot currently stops moving;

obtaining a duration for which the robot currently remains in a stopping state; and stopping, when the current location is within the elevator car, and the duration is greater than a first preset duration threshold, the obtaining of the distance between the robot and the obstacle.

7. The robot according to claim 6, wherein the processor further implements:

obtaining, when the current location is within the elevator car, and the duration is less than or equal to the first preset duration threshold, the distance between the robot and the obstacle; and controlling, in a case that the obtained distance between the robot and the obstacle is greater than the preset distance threshold, the robot to move towards the target elevator-taking place at the preset speed.

8. The robot according to claim 6, wherein the processor further implements:

controlling, when the current location is not within the elevator car, and the duration is greater than a second preset duration threshold, the robot to move towards the target elevator-waiting place, and call the elevator car again.

9. The robot according to claim 8, wherein the processor further implements:

obtaining, when the current location is not within the elevator car, and the duration is less than or equal to the second preset duration threshold, the distance between the robot and the obstacle; and controlling, in a case that the obtained distance between the robot and the obstacle is greater than the preset distance threshold, the robot to move towards the target elevator-taking place at the preset speed.

10. The robot according to claim 6, wherein the processor further implements:

controlling, in a case that the robot receives an elevator-taking instruction, the robot to move towards the target elevator-waiting place which has been deployed;

calling, through a first communication protocol, the elevator car to move to a floor where the robot is located, and sensing, through a second communication protocol, whether a door of the elevator car is opened; and controlling, in a case that the door of the elevator car is opened, the robot to move towards the target elevator-taking place in the elevator car which has been deployed.

11. A non-transitory computer-readable storage medium having a computer program stored therein, wherein the computer program, when executed by a processor, causes the processor to:

obtain, a distance between a robot and an obstacle in a moving route as the robot moves from a target elevator-waiting place to a target elevator-taking place in an elevator car; and control, when the distance is greater than a preset distance threshold, the robot to move towards the target elevator-taking place at a preset speed until the robot enters the elevator car;

control, when the distance is less than the preset distance threshold, the robot to stop moving;

obtain information on a current location of the robot when the robot currently stops moving;

obtain a duration for which the robot currently remains in a stopping state; and stop, when the current location is within the elevator car, and the duration is greater than a first preset duration threshold, the obtaining of the distance between the robot and the obstacle.

12. The non-transitory computer-readable storage medium according to claim 11, wherein the computer program further causes the processor to:

obtain, when the current location is within the elevator car, and the duration is less than or equal to the first preset duration threshold, the distance between the robot and the obstacle; and control, in a case that the obtained distance between the robot and the obstacle is greater than the preset distance threshold, the robot to move towards the target elevator-taking place at the preset speed.

13. The non-transitory computer-readable storage medium according to claim 11, wherein the computer program further causes the processor to:

control, when the current location is not within the elevator car, and the duration is greater than a second preset duration threshold, the robot to move towards the target elevator- waiting place, and call the elevator car again.

14. The non-transitory computer-readable storage medium according to claim 13, wherein the computer program further causes the processor to:

obtain, when the current location is not within the elevator car, and the duration is less than or equal to the second preset duration threshold, the distance between the robot and the obstacle; and control, in a case that the obtained distance between the robot and the obstacle is greater than the preset distance threshold, the robot to move towards the target elevator-taking place at the preset speed.

* * * * *